US012605994B2

(12) United States Patent
Kosch et al.

(10) Patent No.: US 12,605,994 B2
(45) Date of Patent: Apr. 21, 2026

(54) CABLE SECUREMENT BRACKET FOR A VEHICLE SUNROOF ASSEMBLY

(71) Applicant: AISIN Corporation, Kariya (JP)

(72) Inventors: Glover Allen Kosch, Ann Arbor, MI (US); Joel Thomas Runyan, Canton, MI (US); Michael Arthur Mixon, Brighton, MI (US); Jacob Celina Grimaldo, Westland, MI (US)

(73) Assignee: AISIN CORPORATION, Kariya (JP)

( * ) Notice: Subject to any disclaimer, the term of this patent is extended or adjusted under 35 U.S.C. 154(b) by 362 days.

(21) Appl. No.: 18/327,496

(22) Filed: Jun. 1, 2023

(65) Prior Publication Data

US 2024/0399842 A1      Dec. 5, 2024

(51) Int. Cl.
*B60J 7/043* (2006.01)
*B60J 7/057* (2006.01)

(52) U.S. Cl.
CPC ............. *B60J 7/043* (2013.01); *B60J 7/0573* (2013.01)

(58) Field of Classification Search
CPC ..... B60J 7/02; B60J 7/022; B60J 7/043; B60J 7/0573; B60J 7/057
USPC .......................................... 296/216.01–216.9
See application file for complete search history.

(56) References Cited

U.S. PATENT DOCUMENTS

| | | | |
|---|---|---|---|
| 8,075,050 B2 | 12/2011 | Hotta et al. | |
| 8,118,357 B2 | 2/2012 | Hotta et al. | |
| 8,240,752 B2 | 8/2012 | Katayama et al. | |
| 10,525,802 B2 * | 1/2020 | Allen | B60J 7/02 |

FOREIGN PATENT DOCUMENTS

| | | | | |
|---|---|---|---|---|
| JP | 3521668 B2 * | 4/2004 | | |
| JP | 6018953 B2 * | 11/2016 | | B60J 7/022 |

OTHER PUBLICATIONS

JP3521668 Text (Year: 2004).*
JP6018953 Text (Year: 2016).*

* cited by examiner

*Primary Examiner* — Amy R Weisberg
(74) *Attorney, Agent, or Firm* — Sughrue Mion, PLLC

(57) ABSTRACT

A cable securement structure is provided for a vehicle sunroof assembly. The structure includes a rear housing structured to be operably connectible to a vehicle roof and including a cable-receiving groove formed along an underside thereof and structured to receive a portion of a cable therein. The structure also includes a cable securement bracket including a cable-receiving groove structured to receive another portion of the cable therein, the bracket being structured to be securable to the rear housing underside so that the bracket groove is positioned opposite the rear housing groove so as to define a passage between the rear housing and the bracket.

11 Claims, 8 Drawing Sheets

CABLE SECUREMENT BRACKET FOR A VEHICLE SUNROOF ASSEMBLY

TECHNICAL FIELD

The embodiments disclosed herein relate to sunroof assemblies for vehicles and, more particularly, to structures for routing and securing cables in a sunroof assembly so as to prevent interference with operation of the sunroof.

BACKGROUND

In a vehicle sunroof assembly, a drive cable may extend from motors, gears, and/or other sunroof drive mechanisms to driven components such as brackets and other structures (not shown) supporting a glass sunroof panel for movement. The drive cable may be structured for tensioning and de-tensioning to transmit forces to the driven components. The overall length of the drive cable may vary according to the design of a particular sunroof assembly. It is sometimes becomes difficult to route and/or cables of varying lengths to prevent portions of the drive cable from migrating into areas where it may interfere with vehicle assembly operations, prevent or interfere with operation of other sunroof components, or become subject to damage.

SUMMARY

In one aspect of the embodiments described herein, a cable securement structure is provided for a vehicle sunroof assembly. The structure includes a rear housing structured to be operably connectible to a vehicle roof and including a cable-receiving groove formed along an underside thereof and structured to receive a portion of a cable therein. The structure also includes a cable securement bracket including a cable-receiving groove structured to receive another portion of the cable therein, the bracket being structured to be securable to the rear housing underside so that the bracket groove is positioned opposite the rear housing groove so as to define a passage between the rear housing and the bracket.

In another aspect of the embodiments described herein, a cable securement bracket for a sunroof assembly is provided. The bracket includes a body portion, a first arm extending from the body portion, and a cable-receiving groove extending along the first arm between the body portion and an end portion of the first arm.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

It will be appreciated that for simplicity and clarity of illustration, where appropriate, reference numerals may have been repeated among the different figures to indicate corresponding or analogous elements. Also, similar reference numerals appearing in different views may refer to similar elements appearing in those views. In addition, the discussion outlines numerous specific details to provide a thorough understanding of the embodiments described herein. Those of skill in the art, however, will understand that the embodiments described herein may be practiced using various combinations of these elements.

DETAILED DESCRIPTION

This disclosure relates to routing and securement of a cable in a vehicle sunroof system. A rear housing is structured to be operably connectible to a vehicle roof and includes a cable-receiving groove formed along an underside thereof. The rear housing is structured to receive a portion of the cable therein. A cable securement bracket includes a body portion and a first arm extending from the body portion. A cable-receiving groove extends along the first arm between the body portion and an end portion of the first arm and is structured to receive another portion of the cable therein. The cable securement bracket is structured to be securable to the rear housing underside so that the bracket groove is positioned opposite the rear housing groove so as to define a passage between the rear housing and the bracket through which the cable extends when the cable is mounted in the sunroof assembly.

Figure 1:
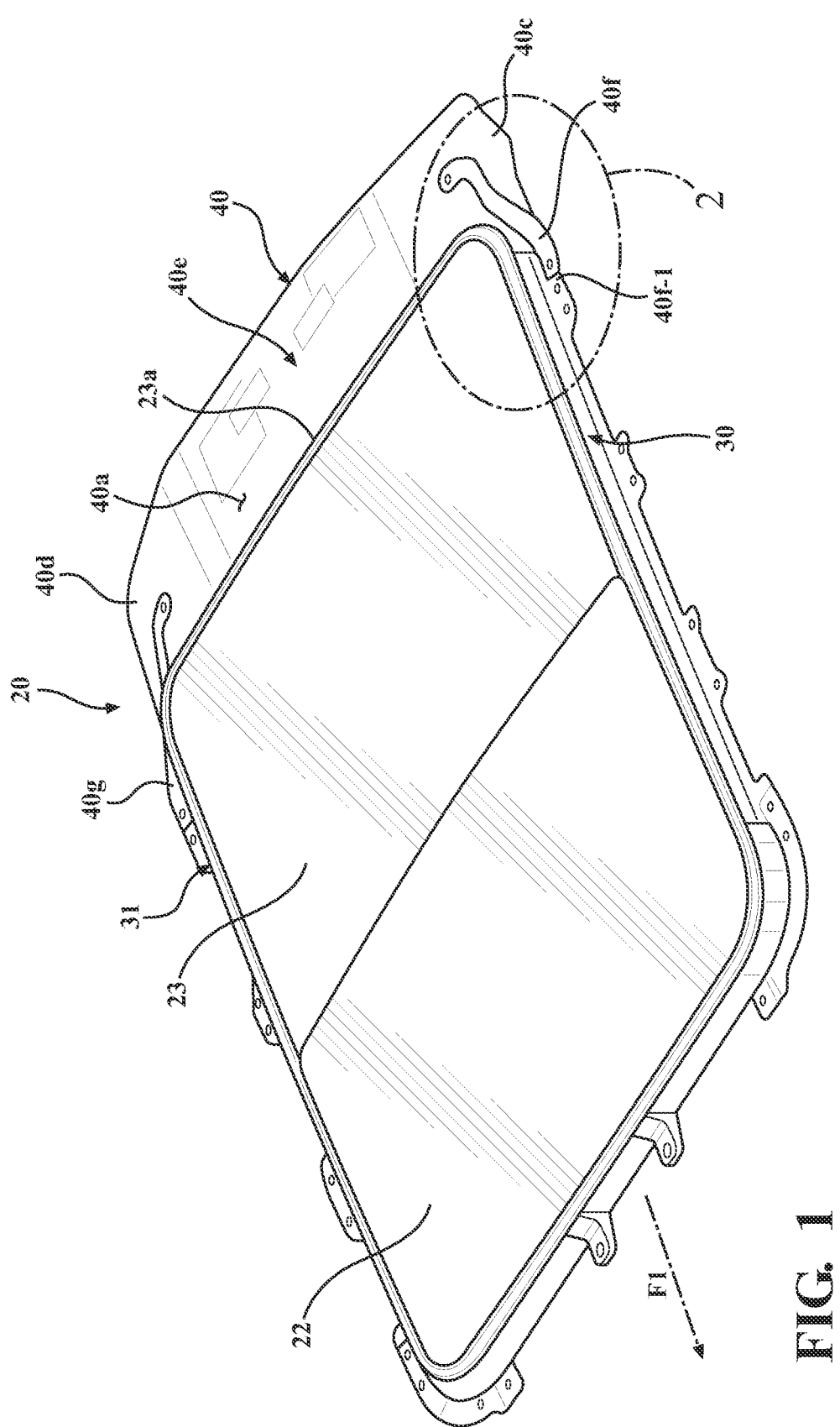
FIG. 1 is a schematic perspective view of a vehicle sunroof assembly incorporating a cable securement structure in accordance with an embodiment described herein.

FIG. 1 is a schematic perspective view of a sunroof assembly 20 for a vehicle. For purposes described herein, a "sunroof assembly" may be defined as including a vehicle sunroof and also any component or sub-assembly mounted on (or adjacent to) a vehicle roof, that enables or facilitates operation (e.g., raising, lowering, opening, closing, etc.) of the sunroof. As known, a sunroof opening (not shown) formed in the vehicle roof may include a forward edge, a rear edge located opposite the forward edge, and two opposed side edges. Referring to FIG. 1, the sunroof assembly 20 may include glass panels 22, 23 structured to cover the sunroof opening. One or more of panels 22, 23 may be movable during operation of the sunroof assembly 20.

The sunroof assembly 20 may include a pair of guide rails 30, 31. As known, each guide rail may extend along a respective side edge of the sunroof opening. The guide rails 30, 31 may be structured to, in cooperation, guide reciprocating components of the sunroof assembly (such as a moving glass sunroof panel and its supporting and drive elements) in forward and rearward directions and also in upward and downward directions.

Referring to FIGS. 2-6, in embodiments of the sunroof assembly, a drive cable 72 may extend between motors, gears, and/or other sunroof drive mechanisms (not shown) coupled to the rear housing 40, and associated driven components such as brackets and other structures (not shown) supporting the glass sunroof panel for movement. The drive cable 72 may be structured for tensioning and de-tensioning to transmit forces to the driven components. The overall length of the drive cable 72 may vary according to the design of a particular sunroof assembly.

It is sometimes becomes difficult to route and/or secure the drive cable 72 to prevent portions of the cable from migrating into areas where it may interfere with vehicle assembly operations, prevent or interfere with operation of other sunroof components, or become subject to damage. In embodiments described herein, it is desired to operably connect and secure one or more portions of the drive cable 72 in position(s) below the guide rail 30 and the rear housing 40. Such positioning may aid in routing the drive cable 72 from the drive motor to a path extending below the rear housing 40, and may obviate a need to secure the drive cable 72 in a position above the rear housing 40 or the guide rail 30. Such positioning may also enable increases in overall cable length to be accommodated, and may prevent the drive cable 72 from interfering with mounting of the sunroof assembly components onto the vehicle.

Figure 2:
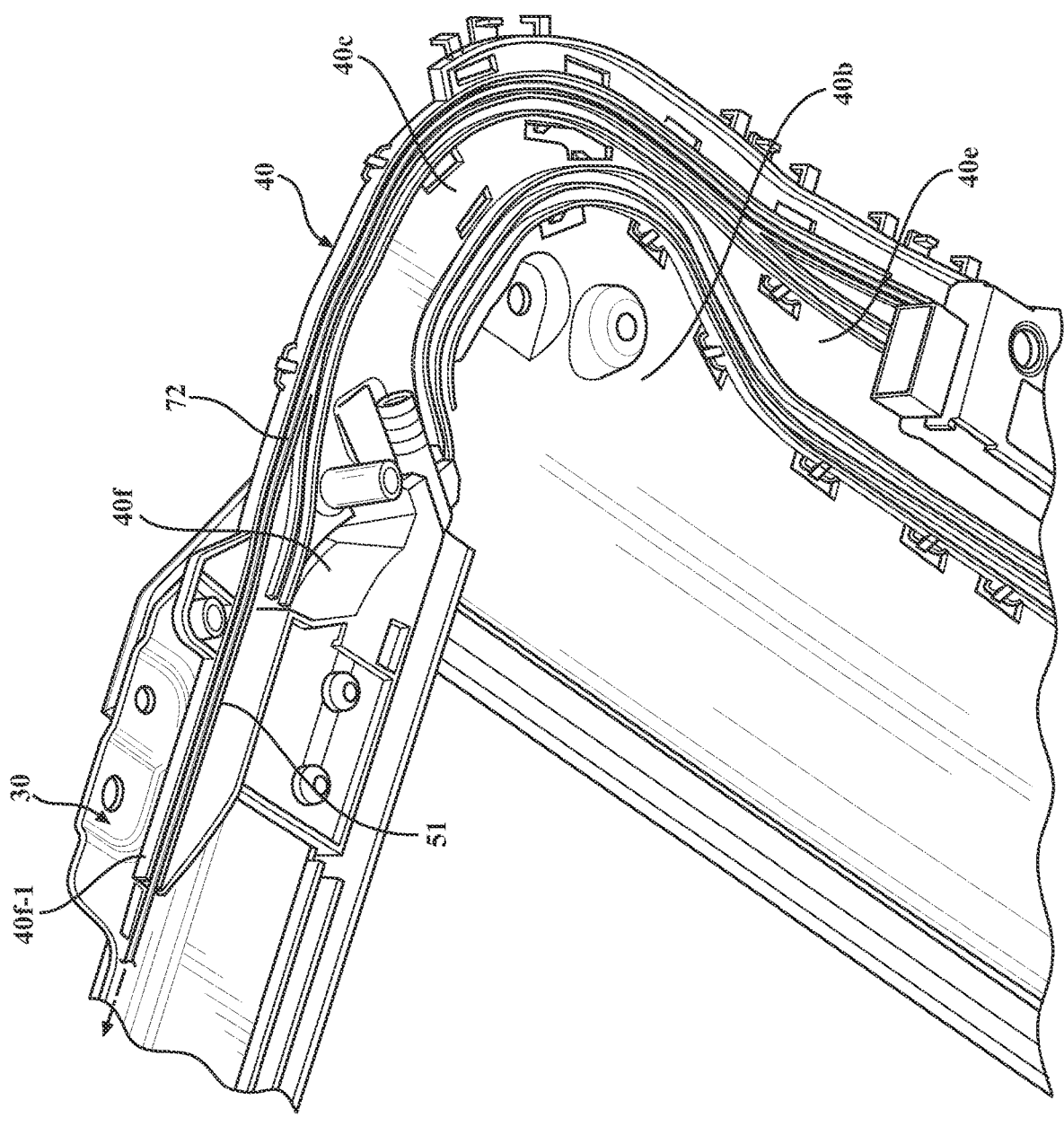
FIG. 2 is a schematic perspective view of an underside of a rear housing in accordance with an embodiment described herein, showing a cable mounted in a cable-receiving groove of the rear housing.

FIG. 2 is a schematic perspective view of an underside of a rear housing 40 of the sunroof assembly shown in FIG. 1, located at a corner 20a of the sunroof assembly, and showing a cable mounted in a cable-receiving groove of the rear housing. Referring to FIGS. 1 and 2, the sunroof assembly rear housing 40 may be structured to be operably connectible to a roof of the vehicle (not shown). The present disclosure will describe structural and functional relationships between the rear housing 40, a single guide rail 30 of the pair of guide rails, and a single associated cable securement bracket 50 (described below) structured to have a portion extending along a single side edge of the sunroof opening. However, it will be understood that the description provided may apply to such elements extending along either side edge of a sunroof opening.

The rear housing 40 may have an upper side 40a structured to face in an upward direction and an underside 40b positioned opposite the upper side 40a and structured to face in a downward direction when the when the rear housing 40 is mounted in its end-use position on a vehicle resting on a ground surface.

The rear housing 40 may have a base portion 40e securable rearwardly of the sunroof rear panel 23 and including mounting(s) for one or more motors, gears, and/or other mechanisms (not shown) configured to control the motion of reciprocating and otherwise movable components of the sunroof assembly, such as glass sunroof panels 22, 23 and any supporting and drive elements. The base portion 40e may extend along and support an entire rear-most edge 23a of the sunroof rear panel 23.

The rear housing 40 may also have a pair of opposed end portions 40c, 40d positioned at opposite ends of the base portion 40e. Projections 40f, 40g may extend from end portions 40c and 40d, respectively. Each projection may structured so as to extend forwardly (i.e., in a forward-moving direction F1 of a vehicle) from the base portion 40e a predetermined distance from a rear-most edge 23a of the sunroof rear panel 23 when the sunroof assembly 20 is mounted on a vehicle. Each of projections 40f, 40g may be structured to be securable to an associated one of guide rails 30, 31 using screws, bolts, adhesive attachment and/or any other suitable method or methods.

Referring to FIG. 2, the rear housing 40 may also include at least one cable-receiving groove 51 formed along the rear housing underside 40b. In one or more arrangements, the cable-receiving groove 51 may extend continuously (i.e., uninterrupted) along at least part of the base portion 40c, from the base portion 40e along the underside 40b to an associated one of the rear housing projections 40f and to an end portion 40f-1 of the associated one 40f of the rear housing projections. As shown in FIG. 2, the cable-receiving groove 51 may be structured to receive at least a portion of a cable 72 therein so that the cable 72 extends along the underside 40b of the rear housing 40.

Figure 6:
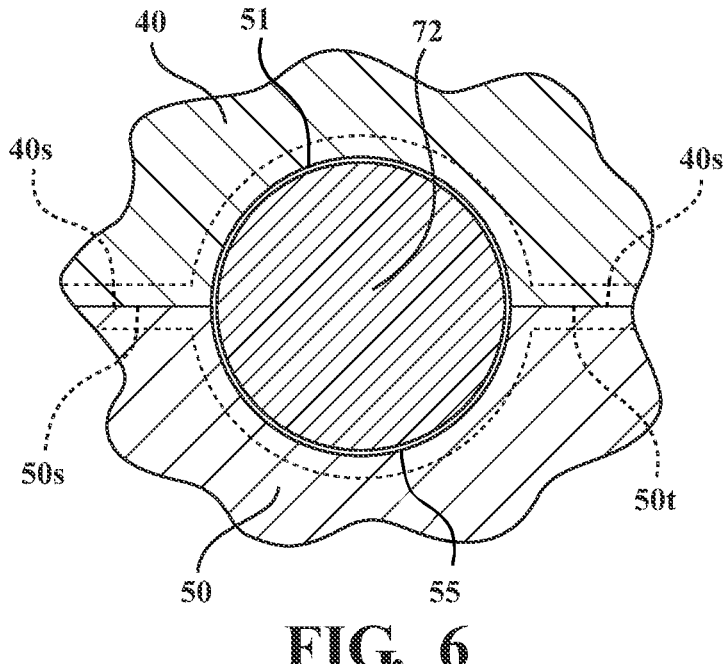
FIG. 6 is a schematic cross-sectional view of a portion of the sunroof assembly shown in FIG. 5A, showing a cable secured in an enclosed passage formed when the cable securement bracket is attached to an underside of the rear housing.

The cable-receiving groove 51 may have a semi-cylindrical cross-sectional shape (as shown in FIG. 6), a semi-square cross-sectional shape, or any other cross-sectional shape suitable for the purposes described herein. In one or more arrangements, the cable 72 may be a drive cable, as previously described. However, cable-receiving groove 51 may also (or alternatively) be structured to receive another type of cable.

In one or more arrangements, the rear housing cable-receiving groove 51 may cooperate with another cable-receiving groove formed in an associated cable securement bracket as described herein to form a tunnel or passage surrounding and securing the cable 72 therein, along a portion of the length of the cable.

The rear housing 40 may include other cable guide features for controlling the paths of cable(s) connecting the sunroof movement control mechanisms to the movable sunroof components. The rear housing 40 may also be structured to enable operable connection of other elements of the sunroof assembly thereto. The terms "operably connected" and "operable connection" as used throughout this description can include direct or indirect connections, including connections without direct physical contact.

Figure 5:
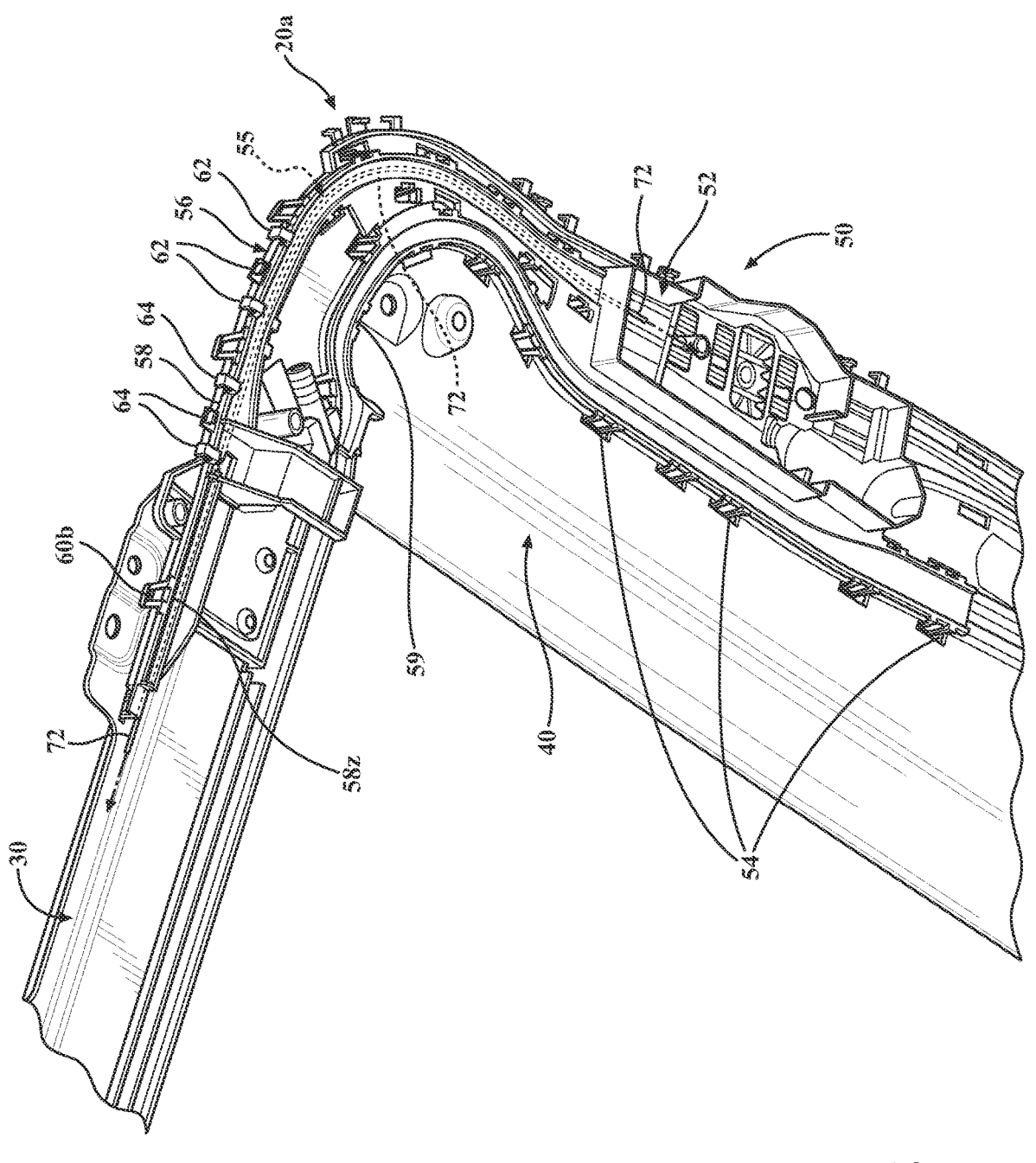
FIG. 5 is a schematic view of a portion of an underside of the sunroof assembly shown in FIG. 1, located at a corner of the sunroof assembly and showing a cable securement bracket attached to a rear housing and guide rail of the sunroof assembly to secure the cable underneath the rear housing and guide rail.
Figure 5A:
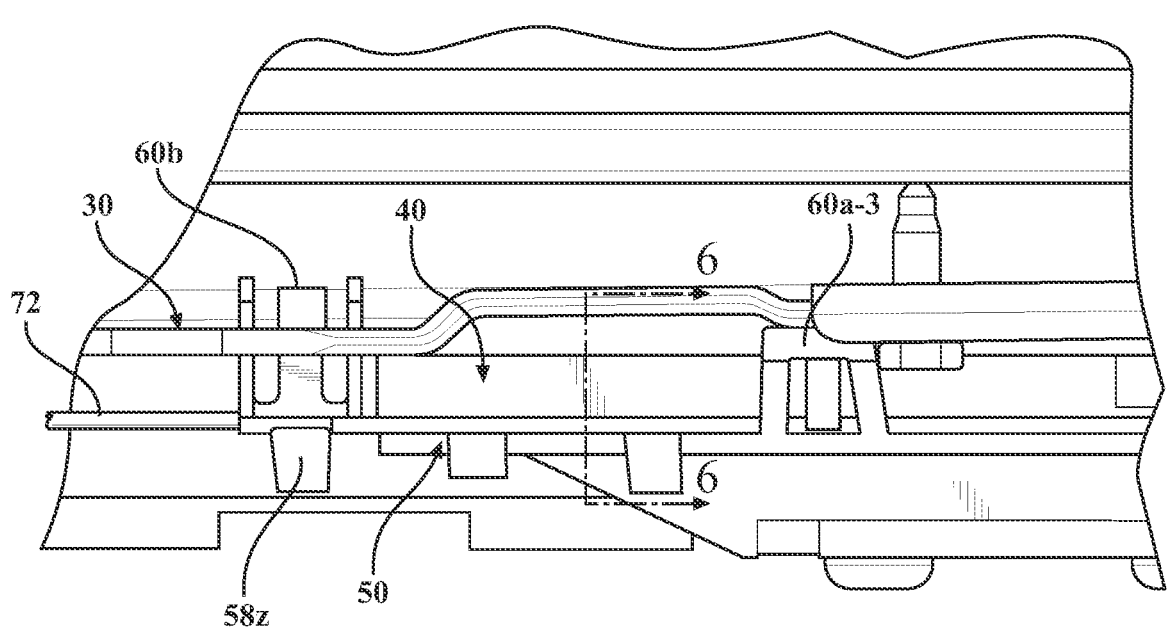
FIG. 5A is a schematic side view of a portion of the sunroof assembly shown in FIG. 5.

Referring to FIGS. 2, 5, and 5A, in one or more arrangements, a rear portion of the guide rail 30 may be attached to an upper surface of the rear housing 40 when the guide rail 30 and the rear housing 40 are attached to the vehicle roof.

Figure 3:
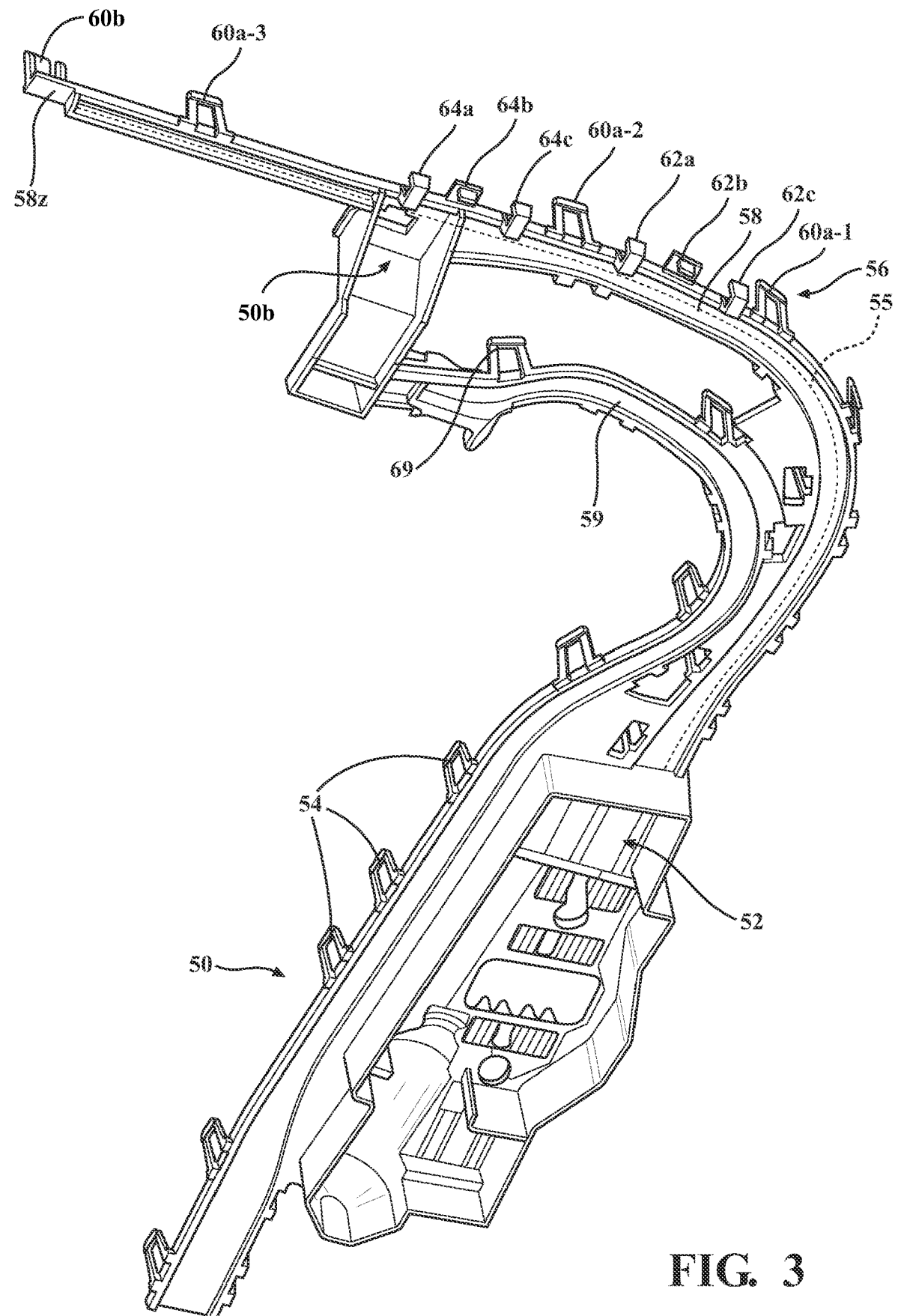
FIG. 3 is a schematic perspective view of an underside of a cable securement bracket in accordance with an embodiment described herein, showing a cable-receiving groove extending along a first arm of the bracket.
Figure 4:
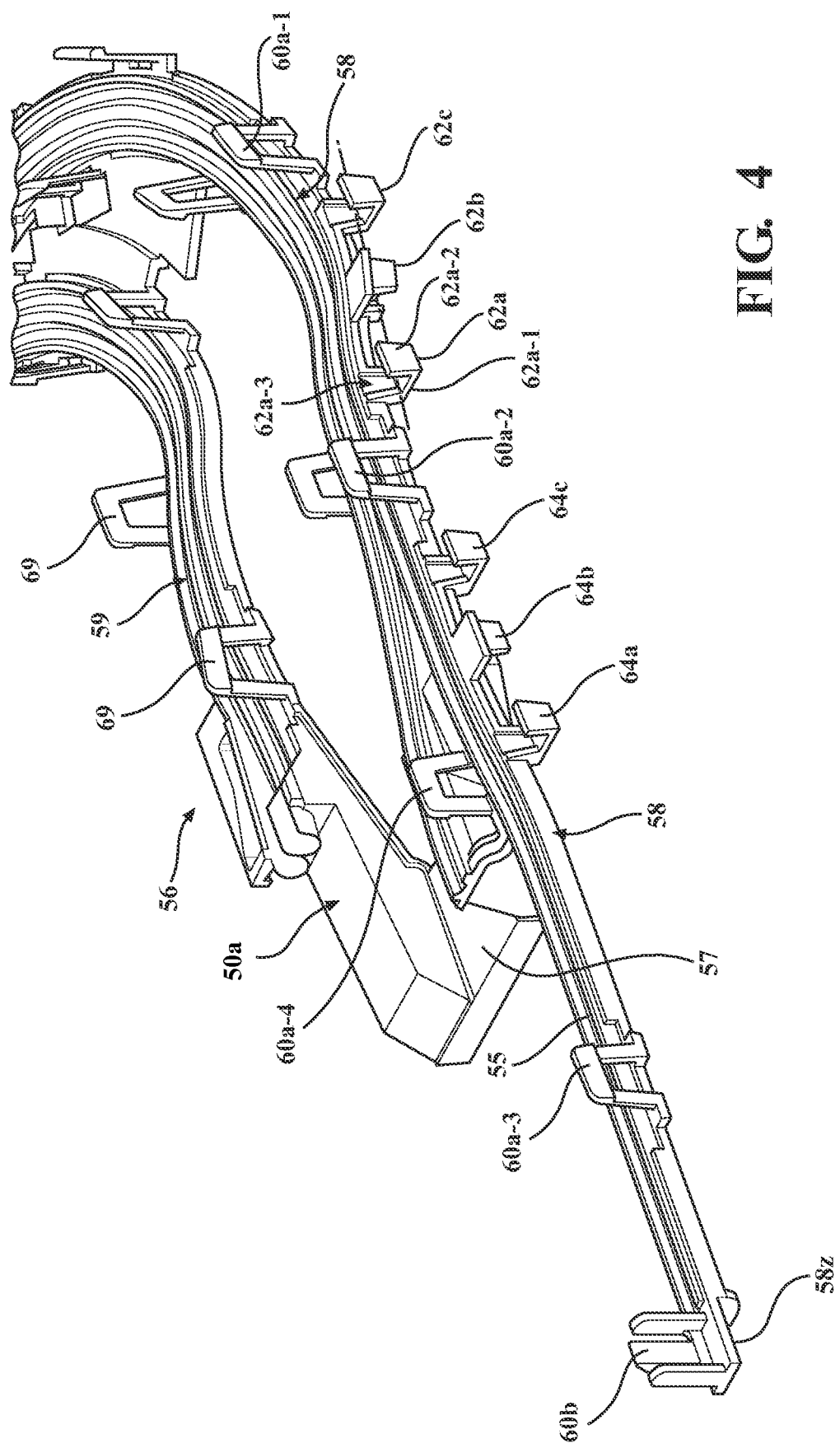
FIG. 4 is a schematic perspective view of an upper portion of part of the cable securement bracket shown in FIG. 3, showing the bracket cable-receiving groove.

Referring to FIGS. 3-5, to attach and secure portions of the cable 72 in position(s) below the guide rail 30 and along the underside 40b of the rear housing 40, a cable securement bracket 50 may be provided. FIG. 3 is a schematic perspective view of an underside of the cable securement bracket 50 in accordance with an embodiment described herein. FIG. 4 is a schematic perspective view of an upper portion of part of the cable securement bracket shown in FIG. 3, showing the bracket cable-receiving groove. The bracket 50 may have an upper side 50a (FIG. 4) structured to face in an upward direction and an underside 50b (FIG. 3) opposite the upper side 50a and structured to face in a downward direction when the when the bracket 50 is mounted in its end-use position on a vehicle resting on a ground surface.

Referring to FIG. 3, in embodiments described herein, the cable securement bracket 50 may include a body portion 52. The bracket body portion 52 may be structured to be operably connectible to the underside 40b of the rear housing 40, below the portion of the rear housing attachable to vehicle roof adjacent a rear end of a sunroof opening. In one or more arrangements, the body portion 52 may facilitate attachment of motors, gears, and/or other sunroof mechanisms to the rear housing 40. As seen from FIG. 3, the body portion 52 may include a plurality of body portion attachment features (generally designated 54) extending therefrom, to enable attachment of the body portion 52 to the rear housing 40. In one or more arrangements, the attachment features 54 may be in the form of resiliently-deflectable latching members extending from one side of the body portion 52 in the same direction. Other forms of attachment feature may also be used. In one or more arrangements, the body portion 52 and its associated attachment features 54 may be the main structure by which the bracket 50 is operably connected to the rear housing 40.

Referring to FIGS. 3 and 4, the bracket 50 may also include a cable retention portion (generally designated 56) extending from the body portion 52. The cable retention portion 56 may incorporate features structured to extend below the rear housing 40 for positioning, guiding, and securing portions of a cable under the rear housing 40 when the cable securement bracket 50 is secured to the rear housing 40. The cable retention portion may also include features for securing a wiring harness thereto.

The cable retention portion 56 may include a first arm 58 extending from the body portion 52. One or more arm attachment features (generally designated 60) may extend from the first arm 58. An arm attachment feature may be a feature structured to facilitate attachment and/or securement of an arm of the cable securement bracket 50 to another element of the sunroof assembly 20. In one or more arrangements, as shown in the drawings, the arm attachment feature(s) 60 may be resiliently-deflectable latching members structured for latching engagement with another complementarily-structured feature located on the other element of the sunroof assembly 20. In other arrangements, the arm attachment feature 60 may be another type of structure designed to attach the first arm 58 to the other element of the sunroof assembly 20.

For example, referring to FIGS. 3 and 4, the first arm 58 may include a first arm attachment feature 60a-1 extending therefrom and a second arm attachment feature 60a-2 extending from the first arm 58 and spaced apart from the first arm attachment feature 60a-1. In addition, a third arm attachment feature 60a-3 may extend from the first arm 58 and may be positioned so that the second arm attachment feature 60a-2 resides between the first arm attachment feature 60a-1 and the third arm attachment feature 60a-3. A fourth arm attachment feature 60a-4 may extend from the first arm 58 and may be positioned so that the fourth arm attachment feature 60a-4 resides between the second arm attachment feature 60a-2 and the third arm attachment feature 60a-3. Additional arm attachment features may be incorporated into the first arm 58 as needed. In particular arrangements, the arm attachment features 60a-1, 60a-2, 60a-3, and 60a-4 extend from the first arm 58 in the same direction.

Referring to FIGS. 3 and 4, the first arm 58 may include at least one cable-receiving groove 55 formed along the upper side 50a of the bracket and extending along the first arm 58 between the bracket body portion 52 and an end portion 58z of the first arm 58. In particular arrangements, the cable-receiving groove 55 may extend continuously along the first arm 58 between the bracket body portion 52 and the end portion 58z of the first arm 58. The dashed line of FIG. 3 shows the extent of the cable-receiving groove 55 along the first arm 58 between the body portion 52 and the end portion 58z of the first arm 58.

The cable-receiving groove 55 may be structured to receive at least a portion of a cable therein. In one or more arrangements, the cable may be a drive cable such as cable 72 previously described. However, cable-receiving groove 55 may also (or alternatively) be structured to receive another type of cable. The cable-receiving groove 55 may have a semi-cylindrical cross-sectional shape (as shown in FIG. 6), a rectangular cross-sectional shape, or any other cross-sectional shape suitable for the purposes described herein.

Referring to FIGS. 5 and 5A, the cable securement bracket 50 may be operably connectible to the guide rail 30 and to the rear housing 40 in a location below the rear housing 40, to enable operative connection and securement of portions of the cable below the rear housing 40. The cable securement bracket 50 may be secured to the rear housing 40 using the previously described arm attachment features 60a-1, 60a-2, 60a-3, and 60a-4.

FIG. 6 is a schematic cross-sectional view taken through a representative portion of the sunroof assembly shown in FIG. 5A showing a cable secured in a passage 55 formed when the cable securement bracket 50 is attached to the underside 40b of the rear housing 40. Referring to FIG. 6, in one or more arrangements, the rear housing cable-receiving groove 51 may combine and cooperate with the first arm cable-receiving groove 55 to form a tunnel or passage surrounding and securing the cable 72 therein, along at least a portion of a length of the cable 72 that extends between the bracket body portion 52 and the end portion 58z of the bracket first arm 58. That is, the cable-receiving grooves 51 and 55 may be structured so that when the bracket 50 is attached to the rear housing 40, the grooves 51 and 55 are aligned so as to form the passage enclosing the cable 72.

As seen in FIG. 6, in one or more arrangements, surfaces 50s, 50t of the bracket 50 immediately adjacent the bracket groove 55 along either side of the bracket groove are structured to be in physical contact with corresponding opposed surfaces 40s, 40t of the rear housing 40 immediately adjacent either side of the rear housing groove 51, when the bracket 50 is secured to the underside 40b of the rear housing 40. The combination of grooves 51 and 55 define an enclosed passage along the portion of the length of cable 72 that extends through the passage. The passage defined by grooves 51 and 55 may surround or enclose the cable 72 as shown along an entire length of the cable-receiving grooves 51, 55 where the portions of the first arm 58 and rear housing 40 defining the grooves 51, 55 are in contact with each other.

Since the cable 72 is completely enclosed or surrounded along the length of cable positioned in the passage formed by grooves 51 and 55, this portion of the cable is protected against snagging, abrasion, and other types of damage and also prevented from interfering with the operation of the sunroof assembly mechanisms.

In particular arrangements, the cross-sectional dimensions and shape of the passage defined by grooves 51 and 55 may be specified (according to cable dimensions, material(s) from which the cable (or a jacket covering the cable) is formed, and other pertinent factors) so as to permit the cable 72 to slide freely along its length within the passage, if needed for operation of the sunroof.

Figure 7:
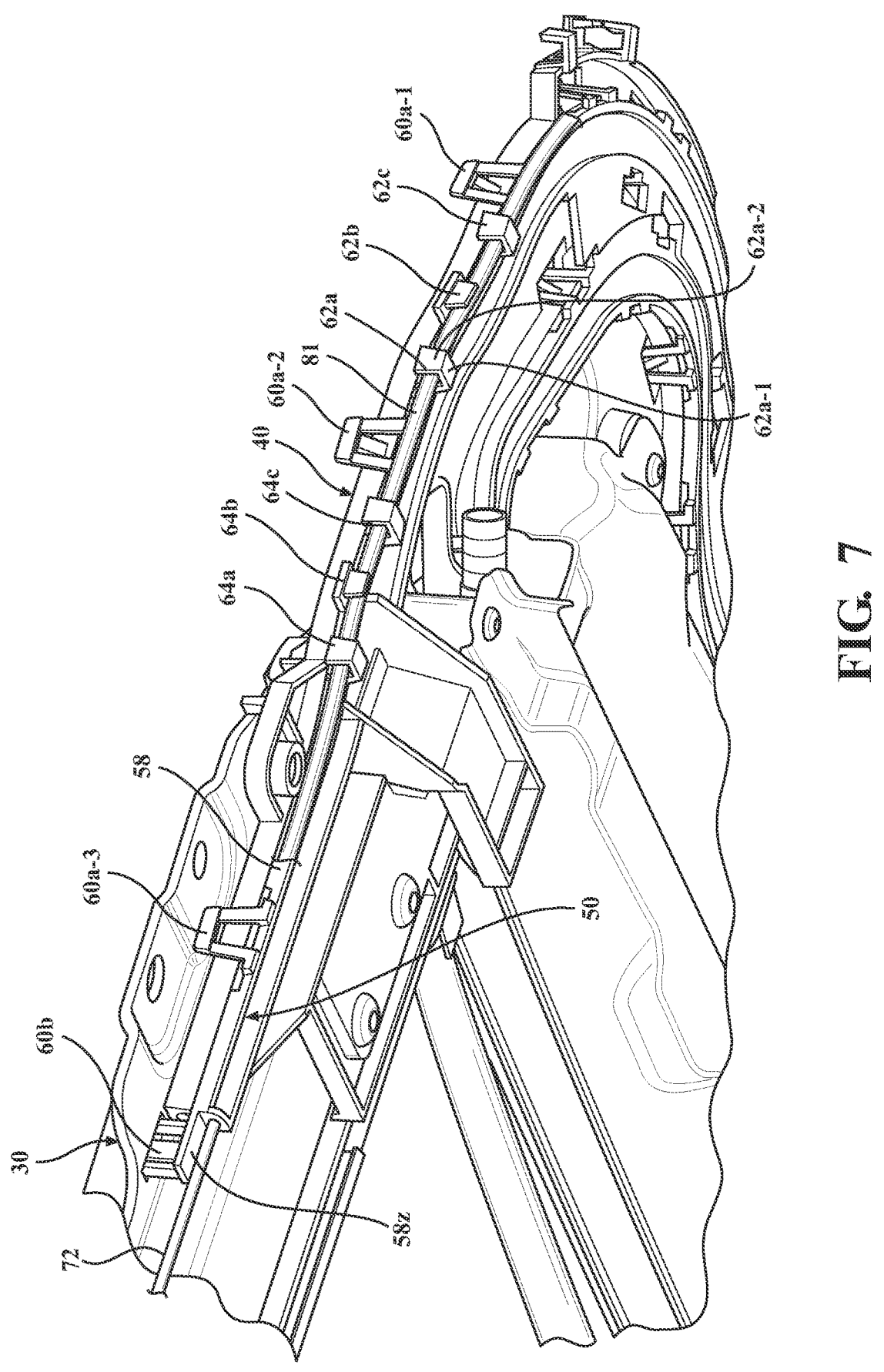
FIG. 7 is a schematic perspective view showing the cable securement bracket attached to the rear housing and guide rail, and showing a wiring harness also secured in the bracket.

Referring now to FIG. 7, a plurality of fingers (generally designated 62 and 64) may extend from the first arm 58. The fingers 62, 64 may be structured to, in combination, retain and secure a wiring harness 81 to the bracket 50. For example, FIGS. 4, 5, and 7 show harness-receiving fingers 62, 64 extending from the first arm 58. Referring to harness-receiving finger 62a of FIG. 7 as an example of a typical harness-receiving finger structure, each harness-receiving finger may include a base (similar to base 62a-1) projecting outwardly from the first arm 58, and a wall (similar to wall 62a-2) extending generally perpendicularly from the base. The first arm 58, the base, and the wall may combine to define a harness-receiving cavity and an opening extending into the cavity. The other harness-receiving fingers (64a, 64b, 64c, 62b, and 62c) shown in FIGS. 4, 5, and 7 may have structures similar to harness-receiving finger 62a.

Each harness-receiving finger may be structured so that a portion of a harness may be inserted into a cavity of the harness-receiving finger through the associated opening. Each harness-receiving finger may be structured so that when a portion of the harness resides in the cavity, that portion of the harness may be prevented from moving in any direction other than back toward the opening. In some arrangements, the harness-receiving fingers may be resiliently deflectable. In one or more arrangements, the harness-receiving finger may be structured to engage the received portion of the harness in a slight interference fit, to aid in preventing movement of the portion of the harness out of the cavity.

Referring again to FIGS. 3 and 4, the first arm end portion 58z may incorporate an arm end portion attachment feature 60b extending from the end portion. The arm end portion attachment feature 60b may be an attachment feature structured for attaching the first arm 58 to a guide rail (such as guide rail 30 of the sunroof assembly 20). In some arrangements, since the arm end portion attachment feature 60b is structured to operably connect the first arm 58 to a guide rail rather than to the rear housing 40, the arm end portion attachment feature 60b may have a structure different from the first arm attachment feature 60a-1 and the second arm attachment feature 60a-2 previously described. FIG. 5A is a side view of a portion of the sunroof assembly showing the end portion 58z of the first arm 58 attached to the rear housing by attachment feature 60a-3 and also to the guide rail 30 by arm end portion attachment feature 60b.

Referring again to FIGS. 3 and 4, in one or more arrangements, the cable retention portion 56 further includes a second arm 59 extending from the body portion 52 opposite the first arm 58. The second arm 59 may include at least one arm attachment feature 69 extending therefrom and structured as previously described. In particular arrangements, the cable retention portion 56 also includes a connecting portion 57 (FIG. 4) connecting the first arm 58 with the second arm 59. Connecting the first and second arms 58, 59 may more securely and rigidly couple the first arm 58 to the rear housing 40 when the bracket 50 is operably connected to the rear housing 40.

Figure 8:
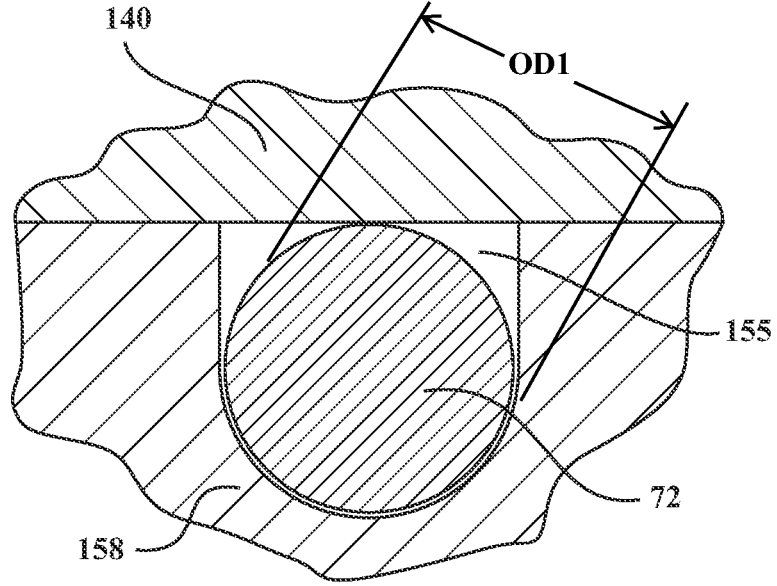
FIG. 8 is a schematic cross-sectional view of a cable securement structure in accordance with an alternative embodiment of the invention.

FIG. 8 is a schematic cross-sectional view of a cable securement structure in accordance with an alternative embodiment of the invention, taken at the location of the cross-sectional view shown in FIG. 6. In this embodiment, a cable-receiving groove 155 formed in a first arm 158 of an alternative bracket 150 is structured to receive an entire maximum outer dimension OD1 of the cable 72 therein. For example, in an embodiment of the cable 72 that is cylindrical, the maximum outer dimension OD1 may be an outer diameter of the cable. In an embodiment of the cable 72 that is elliptical, the maximum outer dimension may be a length of a major axis of the elliptical cross section. This arrangement may obviate the need to form a groove in the rear housing 140 to accommodate a portion of the cable.

In other aspects, and as disclosed herein, a sunroof assembly 20 for a vehicle is provided. The sunroof assembly 20 may include a cable securement bracket in accordance with an embodiment described herein.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5C, but the embodiments are not limited to the illustrated structure or application.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cable securement structure for a vehicle sunroof assembly, the structure comprising:
    a rear housing structured to be operably connectible to a vehicle roof and including a rear housing groove formed along an underside thereof and structured to receive a portion of a cable therein; and
    a cable securement bracket comprising:
        a body portion;
        a first arm extending from the body portion; and
        a bracket groove structured to receive another portion of the cable therein and extending along the first arm between the body portion and an end portion of the first arm, the bracket being structured to be securable to the rear housing underside so that the bracket groove is positioned opposite the rear housing groove so as to define a passage between the rear housing and the bracket.

2. The structure of claim 1, wherein the bracket groove and the rear housing groove are continuous, so that a portion of a cable that extends through the passage is enclosed by the bracket and the rear housing.

3. The structure of claim 1, wherein surfaces of the bracket adjacent the bracket groove along either side of the bracket groove are structured to be in physical contact with opposed surfaces of the rear housing along either side of the rear housing groove, when the bracket is secured to the underside of the rear housing.

4. A sunroof assembly including a cable securement structure in accordance with claim 1.

5. A cable securement bracket for a sunroof assembly, the bracket comprising:
    a body portion structured to be connectible to an underside of a rear housing of the sunroof assembly;

a first arm extending from the body portion and structured to be connectible to an underside of a guide rail of the sunroof assembly; and a cable-receiving groove on the upper surface of the body portion and underneath the rear housing and the guide rail, the cable-receiving groove extending along the first arm between the body portion and an end portion of the first arm.

6. The bracket of claim 5, wherein the first arm cable-receiving groove extends continuously along the first arm between the body portion and the end portion of the first arm.

7. The bracket of claim 5, further comprising a second arm extending from the body portion opposite the first arm, the second arm including at least one arm attachment feature extending therefrom.

8. The bracket of claim 7, further comprising a connecting portion connecting the first arm with the second arm.

9. The bracket of claim 7, wherein the first arm cable-receiving groove is structured to receive an entire maximum outer dimension of the cable therein.

10. A sunroof assembly for a vehicle, the sunroof assembly including a cable securement bracket in accordance with claim 5.

11. The structure of claim 1, further comprising a guide rail extending along an opening of the sunroof assembly and connectible to the rear housing, wherein the first arm is structured to be connectible to an underside of the guide rail, and wherein the bracket groove is underneath the rear housing and the guide rail.

\* \* \* \* \*